Patented Nov. 13, 1923.

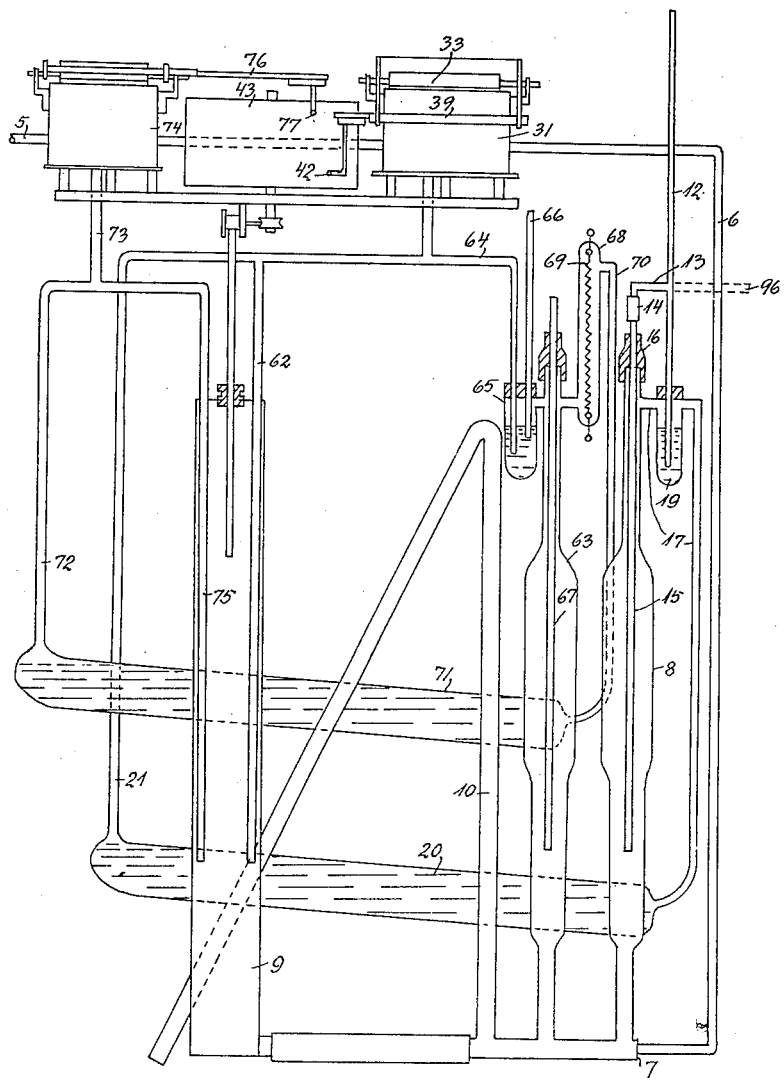

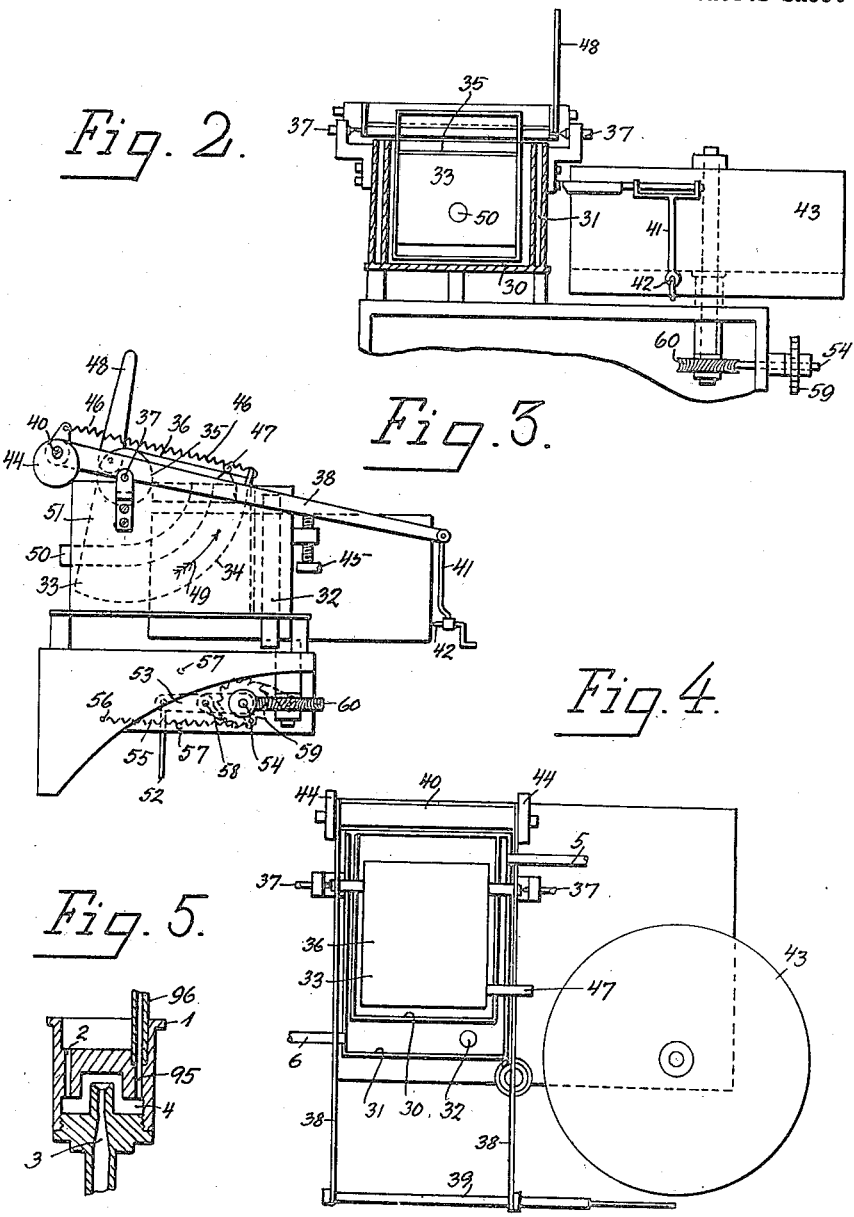

1,474,097

UNITED STATES PATENT OFFICE.

SCHACK AUGUST STEENBERG KROGH AND PETER HARALD PEDERSEN, OF COPENHAGEN, DENMARK.

RECORDING ANALYZING APPARATUS FOR AUTOMATIC ANALYSIS OF GASES.

Application filed May 21, 1920. Serial No. 383,244.

*To all whom it may concern:*

Be it known that SCHACK AUGUST STEENBERG KROGH and PETER HARALD PEDERSEN, subjects of the King of Denmark, residing at Copenhagen, Denmark, have invented certain new and useful Improvements in Recording Analyzing Apparatus for Automatic Analysis of Gases, of which the following is a specification.

The invention relates to self-regulating apparatus for the automatic performance of analyses of gas mixtures, in which apparatus water provides the motive power, being supplied continuously and discharged periodically by siphon-action, and in which apparatus one or more constituents of the gas mixture is or are determined quantitatively by measuring in pipettes, removal of the constituent concerned and remeasuring of the remaining volume in a movable bell, the motion of which is recorded.

According to the invention the water for each individual analysis in apparatus of the above type is supplied at a constant pressure and in adjustable quantity to one or (if required) more measuring pipettes, in order to regulate exactly the time interval between the individual analyses.

The further features and details of the present invention will appear from the following description of the construction shown on the accompanying diagrammatic drawings of an apparatus according to the invention, the said apparatus being intended especially for the automatic registration of the contents of carbon dioxide and carbon monoxide in flue gases.

Figure 1 shows the apparatus in front elevation.

Figure 2 the measuring bell and its recording drum, on an enlarged scale, in front elevation.

Figure 3 is the same in side elevation.

Figure 4 the same in top view.

Figure 5 a recording style for the recording drum, in side elevation.

Fig. 6 a longitudinal section of a device for continuous suction of flue gas to the smoke-supply tube of the apparatus.

The apparatus which is further described below acts mainly in the following manner:

For recording of carbon dioxide the apparatus acts in mainly known manner by a definite quantity of the gas to be analyzed being inhaled, by way of a tube 12, into a first measuring vessel or pipette 8 whereafter the quantity of gas is directed through a receptacle 20 filled with a liquid which absorbs the carbon dioxide, and thence into a second measuring device 31, 33 in which its volume is measured and recorded by means of a recording device 43 provided in connection with the measuring apparatus. For registration of the contents of carbon monoxide in the same quantity of gas, the gas freed of carbon dioxide is inhaled, according to the present invention, from the said measuring device 31, 33 to another pipette 63 together with a definite quantity of atmospheric air sufficient for combustion of carbon monoxide, whereafter the mixture, according to the invention, is driven through a combustion chamber 68 in which the carbon monoxide burns into carbon dioxide. From the combustion chamber, the mixture is then directed through a receptacle 71. wherein the carbon dioxide formed is absorbed, to a measuring bell 74 wherein the volume reduced by the combustion and absorption is measured and recorded.

The apparatus is driven in known manner by water power, water being directed to the apparatus from a water main or some larger vessel, and this water is discharged periodically from the apparatus in known manner by means of a siphon 10. The driving water flows first through the vessel 31 which encloses, in manner further explained below, a receptacle 30 wherein the measuring bell 33 is moving, whereby the advantage is attained that the temperature of the air in the measuring bells 33 and 74 and the measuring pipettes 8 and 63 always remains the same.

One of the vessels 31 by way of which the driving water is flowing is fitted with an overflow so that the water level is maintained constant, the advantage being thereby attained that the analyses will always be performed at uniform time intervals. As the driving water, besides rising in the measuring pipettes, also rises in the receptacle 9 it actuates by its weight, as further explained below, the recording drum 43 of the apparatus and rotates the same a certain distance forward for each analysis whereby the time measurement of the apparatus is effected. After discharge by way of the siphon 10, the driving water passes through a suction device 1—2 (Fig. 5) which is further described below and communicates with the flue gas supply pipe 12 of the apparatus and causes an inhalation of smoke by way of the said pipe previously to each analysis, so that always quite fresh smoke from the fire will be analyzed.

The further details of the invention will appear from the following more explicit description of the apparatus shown.

The driving water is supplied through a pipe 5 (Fig. 1) to the vessels 74 and 31 (Figs. 1 to 4) which encircle the receptacle 30 in which the measuring bell concerned is moving. The driving water receptacle 31 is fitted with an overflow-pipe 32, Figs. 3 and 4, so that the water level in 31 is maintained perfectly constant. From the receptacle 31, there is provided a pipe 6 to the branching point 7 whence the water distributes itself to the pipettes 8 and 63, the receptacle 9 and the siphon 10. Hereby the water rises in these, until the siphon enters into action and discharges the water. When the water is discharged from the pipette and the vessel 9, the activity of the siphon will cease, and the water will then rise once more in these.

The flue gas to be analyzed is inhaled by way of a pipe 12. The latter is fitted partly with a branch pipe 96 communicating with the suction device further described in the following, Fig. 5, and partly with a branch pipe 13 communicating, by way of a rubber hose 14, with an adjustable pipe 15 which extends down into the pipette 8 and is tightened against the same by means of a packing 16.

From the pipette 8 extends, at top, a pipe 17 which communicates partly with a liquid trap 19, into which the tube 12 dips down, and partly with the absorption vessel 20. When the water sinks in the pipette 8, smoke will be inhaled through the liquid trap 19 and, finally, when the water has sunk below the downward facing aperture of the tube 15, through the tube 15. When the water rises again, smoke will first be driven back through the pipe 15, but when the downwardly directed orifice of the latter is stopped by the water, the volume of flue gas enclosed in the pipette will be driven through the absorption vessel 20 wherein the carbon dioxide of the smoke is absorbed. The pipe 15 is adjusted in such a manner that the quantity of flue gas cut off equals for instance exactly 100 cm³. From the absorption vessel 20, the remainder of the smoke, which is freed of carbon dioxide, is pressed up through the pipe 21 into the measuring bell 33 by whose motion its volume is recorded, by means of a style, on a rotary recording drum.

The measuring and recording device, which is shown in Figs. 2 to 4, consists of a water receptacle 30, which is enclosed by another water receptacle 31.

In the receptacle 30 there is suspended a bell 33 shaped as shown in Fig. 3 as a sector, its limiting surfaces being two cylinder surfaces 34 and 35 and a plane surface 36 besides the two sector-shaped end walls. The bell is hung on two spindles 37, which are located co-axially with the cylinder surface 34.

On the trunnions of the bell 33 are journalled two arms 38 forming in combination with the two cross-pieces 39 and 40 a frame supporting an arm 41 with a recording style 42, which traces a curve on a rotary recording drum 43. Each arm 38 supports a counterpoise 44, which almost counterbalances the frame 38, 39, 40 and the recording style 42, so that the arm bears quite lightly against an adjusting screw 45 on the receptacle 31. A spring 46 connects the arm 40 to the bell 33 and, thereby, counterbalances the same, so that it normally tends to occupy the position shown in Fig. 3, although actuated only by a quite inconsiderable overweight. The bell 33 is fitted with a pin 47 resting, when the bell occupies its bottommost position, on one of the arms 38. When the bell turns about its pivots 37 in the direction of the arrow 49, Fig. 3, the frame 38, 39, 40 will remain stationary until the pin 47 strikes a tappet 48 provided on the arm 38. By further rotation of the bell 33 this latter and the said frame will move together, and the recording style will register the motion on the recording drum. When the recording style is moved by the drum, the friction will thus be reduced to the friction against the pivots of the bell and between the style and the recording drum.

The style 80, which is shown in Fig. 6, consists of a bent glass tube, whose horizontal branch with its end drawn out into a point 81 touches the recording paper on the drum. The vertical branch 82 is bent sharply at bottom and, when the recording apparatus is at rest, it dips into a not shown ink-vessel, so that the recording style is maintained filled by capillary action, while the bend 83 prevents air bubbles from entering therein.

In the rear wall of the receptacle 30 a tube 50, Figs. 2 and 3, has its orifice, and it communicates with the pipe 21, Fig. 1. As shown in Fig. 3, the pipe 50 is bent upward and terminates in the bell 33, it being introduced therein by way of the open side 51 of the bell.

The described portion of the measuring apparatus acts in the following manner:

Owing to its excess pressure, the quantity of air directed into the bell 33 from the absorption vessel 20 by way of the tube 21 and the tube 50 turns the bell in direction of the arrow 49, Fig. 3. The bell should rotate exactly through 90°, when it receives the volume of air which is enclosed in the pipette 8 from the moment when the water closes the lower opening of the pipe 15. This may easily be attained once for all by adjustment of the sliding tube 15. The tappet 48 is adjusted in such a manner that the pin 47 touches it when the bell has rotated through four fifths of 90°. During the remainder, viz: one fifth or 20% of the rotation of the bell, the style 42 is moved, and the length of the arm 38 from its pivot to the point where the style is attached is calculated in such a manner that the style moves exactly 40 mm. during the last fifth of the rotation of the bell, whereby the result is attained that the motion of the style is reduced by 2 mm. for each per cent of carbon dioxide absorbed, until its motion becomes zero by absorption of 20% carbon dioxide.

For each individual analysis made, the recording drum is turned forward 1/480 of a revolution, corresponding to twenty analyses per hour or 480 during 24 hours. This motion is produced by the apparatus described in the following.

The receptacle 9, Fig. 1, is connected by means of a rubber hose 81, whereby it is filled and emptied, to the vertical branch of the siphon 10, and the receptacle is supported by a rod 52. As shown in Fig. 3, the latter is suspended from a bell-crank lever 53, which is journalled about a spindle 54 and whose downwardly directed branch is connected, by means of a helical tensile spring 55, to a fixed pin 56. The bell-crank lever 53 is adapted to swing between two fixed stops 57. It supports a pawl 58 engaging a ratchet wheel 59 which is provided on the spindle 54, and is moved one tooth forward by the pawl 58, whenever the rod 52 is raised and lowered. On the shaft 54 there is provided a worm engaging a worm wheel 60 on the shaft of the recording drum 43.

The spring 55 is sufficiently strong to hold the lever 53 against the upper stop 57 when the vessel 9, Fig. 1, is empty or half full of water. Gradually, as the vessel 9 is filled more and more with water, a moment will arrive, when the weight of the receptacle with contents and the parts belonging thereto becomes so large that the tension of the spring 55 is overcome, and the arm 53 is turned down against the lower stop 57. When now the siphon 10 enters into action and empties the receptacle 9, the spring 55 will again lift the receptacle 9, and the lever 53 will then be moved up against the upper stop 57. Every time the receptacle 9 is thus filled and emptied, the lever 53 will turn the ratchet wheel 59 one tooth forward, and this motion will be transmitted by means of the worm wheel 60 to the recording drum 43.

The rod 52 is threaded and is connected, by means of an adjustable nut 61, to the receptacle 9; and by adjustment of this nut this receptacle may be raised or lowered, whereby the quantity of water consumed for each analysis may be regulated, and as the water pressure is constant, the time consumed for each analysis may thereby be varied. The receptacle 9 causes also the pipette 8 to be filled and emptied at approximately uniform speed.

By means of a pipe 64 and a liquid trap 65 the measuring bell 33 in the measuring apparatus 31 is connected to the top end of the pipette 63. When the water sinks in the latter there will, therefore, be inhaled through the pipe 64 and the said liquid trap 65 a certain portion of the air measured in the bell 33. At the same time, there will be inhaled, through the pipe 66 whose free area of passage may be regulated, a definite quantity of atmospheric air, which is thoroughly mixed with the flue gas, so that the latter will contain a sufficient quantity of oxygen for combustion of the carbon monoxide which may be present.

The bore of the tube 66 may suitably be dimensioned in such a manner that there will be inhaled into the pipette 20 cm$^3$ of atmospheric air and 80 cm$^3$ of flue gas from the measuring bell 33. The quantity of flue gas then still remaining in the measuring bell 33 is discharged in known manner by way of the tube 62 when the water in the receptacle 9 sinks below the downwardly directed orifice of the latter. By way of the tube 67 there will then finally be inhaled a slight quantity of atmospheric air into the pipette 63, and when the water rises once more after the siphon has been emptied, air will be driven out through this pipe, and exactly 100 cm$^3$ of the gas mixture inhaled will be cut off and then driven through the chamber 68, which contains an electric heating body 69, which is maintained heated at a suitable temperature, so that the carbon monxide combines with some of the oxygen present and forms carbon dioxide according to the equation $$2CO + O_2 = 2CO_2.$$

The gas mixture being driven further through the absorption vessel 71, wherein the carbon dioxide formed is absorbed, the remaining gas will arrive by way of the tubes 72 and 73 to the measuring bell 74, where it will be measured and recorded exactly in the same manner as in the measuring bell 33. From the bell 74 the gas is finally discharged through the pipe 75, when the water in the receptacle 9 sinks below the orifice of this pipe.

When the described apparatus is used for continuous analyzing of for instance the smoke from fire places, it is of great importance that the apparatus should show the state of the fire at the given moment. In order to attain this, there is provided at a suitable point of the pipe 12 a suction device of the kind shown in Fig. 2. If this device is connected to the pipe 12 for instance by means of a piece of pipe 96, while the flange 1 is connected to the bottom of a not shown waste-water tank into which the siphon 10 is discharging, the liquid in the waste-water tank, when flowing through the channels 2 and 3, will produce a suction effect in the pipe 4, the bores of the channels 2 and 3 being adjusted relatively to one another in such a manner that the water is discharged through the channel 3 in small individual columns. During the suction in the chamber 4, flue gas is sucked from the pipe 12 through the pipe 96, and this flue gas is carried along by the water through the pipe 3. Hereby there is produced, in easy and convenient manner, a suction in the pipe 12, so that security is attained that fresh flue gas from the fire will always be inhaled into the measuring apparatus.

The upper orifice of the channel 3 is located slightly above the lower orifices of the channel 2 and the channel 95 in the tube 96, whereby the advantage is attained that the channel 95 will always be cut off from the air, when the supply of water ceases.

The channel 2 may suitably be given a bore which is so large that the waste-water tank will be emptied during the interval between two analyses.

The above described apparatus for measurement of the percentages of carbon dioxide and monoxide in flue gas may be modified in various manner for automatic performance and recording of other technically important gas analyses. For instance, as it appears immediately from the description, the analyzing devices for carbon dioxide and carbon monoxide may be used separately, but the carbon monoxide analysis is dependent on the carbon dioxide having previously been removed from the gas mixture.

The apparatus may further be used for analysis of gas mixtures containing other absorbable gases than carbon dioxide and other combustible gases than carbon monoxide, when the composition of the absorption liquid and, respectively, the quantity of the atmospheric air added and the temperature of the heating body, are adjusted accordingly.

When, instead of atmospheric air, a sufficient quantity of hydrogen is supplied through the pipe 66 from a hydrogen container or a suitable hydrogen generator, the percentage of oxygen in an air mixture may also be recorded after combustion, but carbon dioxide and combustible gases should then be previously removed, however, and their quantities perhaps registered.

Having now particularly described and ascertained the nature of our said invention and in what manner the same is to be performed, we declare that what we claim is:—

1. In an automatically operating gas analyzing apparatus, being driven by a liquid continuously supplied to and periodically discharged by siphon action from the apparatus, comprising a first measuring vessel inserted in the flow of the driving liquid, an absorption vessel, a second measuring vessel, and a recording drum, an overflow vessel inserted in the supplying pipe for the driving liquid in front of said first measuring vessel and adapted to allow the said liquid to flow at a constant pressure to the apparatus, and means to adjust the amount of liquid necessary for each individual analysis.

2. In an automatically operated gas-analyzing apparatus, being driven by a liquid, which is supplied continuously to the apparatus at constant pressure and in adjustable quantity, and is discharged periodically from the apparatus, comprising a first measuring vessel, an absorption vessel, a second measuring vessel and a recording drum, means for revolving said drum by the weight of a part of the driving liquid.

3. In an automatically operated gas-analyzing apparatus, being driven by a liquid, which is supplied continuously to the apparatus at constant pressure and in adjustable quantity, and is discharged periodically from the apparatus, comprising a first measuring vessel, an absorption vessel, a second measuring vessel, and a recording drum, means for revolving said drum by the weight of a part of the driving liquid, said means being adjustable in order to regulate the quantity of driving liquid used for each analysis.

4. In an automatically operating gas-analyzing apparatus, being driven by a liquid, which is supplied continuously to and discharged periodically from the apparatus by siphon action, comprising a first measuring vessel, an absorption vessel, a second measuring vessel and a recording drum, an overflow vessel from which the driving liquid flows at approximately constant pressure and rate of speed to the first measuring vessel and to adjustable means for revolving the said drum by the weight of a part of the said liquid and for regulating the quantity of liquid used for each analysis.

5. In an automatically operating gas-analyzing apparatus, being driven by a liquid, which is supplied continuously to and discharged periodically from the apparatus by siphon action, comprising a first measuring vessel, an absorption vessel, a second measuring vessel and a recording drum, an overflow vessel, encircling a container into which the second measuring vessel dips, and allowing the driving liquid to flow at approximately constant pressure and rate of speed to the first measuring vessel and to adjustable means for revolving the said drum by the weight of a part of the said liquid and for regulating the quantity of liquid used for each analysis.

6. In an automatically operating gas-analyzing apparatus, being driven by a liquid, which is supplied continuously to and discharged periodically from the apparatus by siphon action, comprising a first measuring vessel, an absorption vessel, a second measuring vessel and a recording drum, said second measuring vessel being formed as a bell pivoted about a horizontal axis and dipping into a receptacle, encircled, by an overflow vessel, from which the driving liquid flows at approximately constant pressure and rate of speed into the first measuring vessel and to adjustable means for revolving the recording drum by the weight of a part of said liquid and for regulating the quantity of liquid used for each individual analysis.

7. In an automatically operating gas-analyzing apparatus, being driven by a liquid, which is supplied continuously to and discharged periodically from the apparatus by siphon action, comprising a first measuring vessel, an absorption vessel, a second measuring vessel and a recording drum, an overflow vessel from which the driving liquid flows at approximately constant pressure and rate of speed to the first measuring vessel and to adjustable means for revolving the said drum by the weight of a part of the said liquid and for regulating the quantity of liquid used for each analysis, the said second measuring vessel being a bell dipping in a receptacle surrounded by said overflow vessel, and being formed by two sector-shaped side faces, two coaxial cylindrical surfaces and a plane surface and being pivoted about the horizontal axis of said cylindrical surface, a frame being journaled about the trunnions of the bell and supporting a stylus, the said frame being moved by the bell during the last portion of the raising of the same in said receptacle.

8. In an automatically operating gas-analyzing apparatus being driven by a liquid, which is supplied continuously to and discharged periodically from the apparatus by siphon action, comprising a first measuring vessel, an absorption vessel, a second measuring vessel and a recording drum, an overflow vessel from which the driving liquid flows at approximately constant pressure and rate of speed to the first measuring vessel and to adjustable means for revolving the said drum by the weight of a part of the said liquid and for regulating the quantity of liquid used for each analysis, the said second measuring vessel being a bell dipping in a receptacle surrounded by said overflow vessel, and being formed by two sector-shaped side faces, two coaxial cylindrical surfaces and a plane surface and being pivoted about the horizontal axis of said cylindrical surfaces, a frame being journaled about the trunnions of the bell and supporting a stylus being a glass-tube one end of which slides against a paper on the recording drums, the other end being fitted with an upwardly turned book dipping in ink, when the frame moved by the bell, is in its position of repose.

9. Means for revolving the recording drum of a liquid driven automatically operating analyzing apparatus and for regulating the amount of liquid used for each analysis comprising a vessel, resiliently suspended to a lever which by turning, when liquid is supplied in a suitable quantity into said vessel, causes the recording drum to revolve stepwise for each analysis.

In testimony whereof the foregoing specification is signed in the presence of two witnesses.

SCHACK AUGUST STEENBERG KROGH.
PETER HARALD PEDERSEN.

Witnesses:
W. BANG,
CARL MEUMINGTEN.